Sept. 2, 1952          J. MILLER          2,608,862
TEMPERATURE INDICATOR DEVICE
Filed May 1, 1947          2 SHEETS—SHEET 1
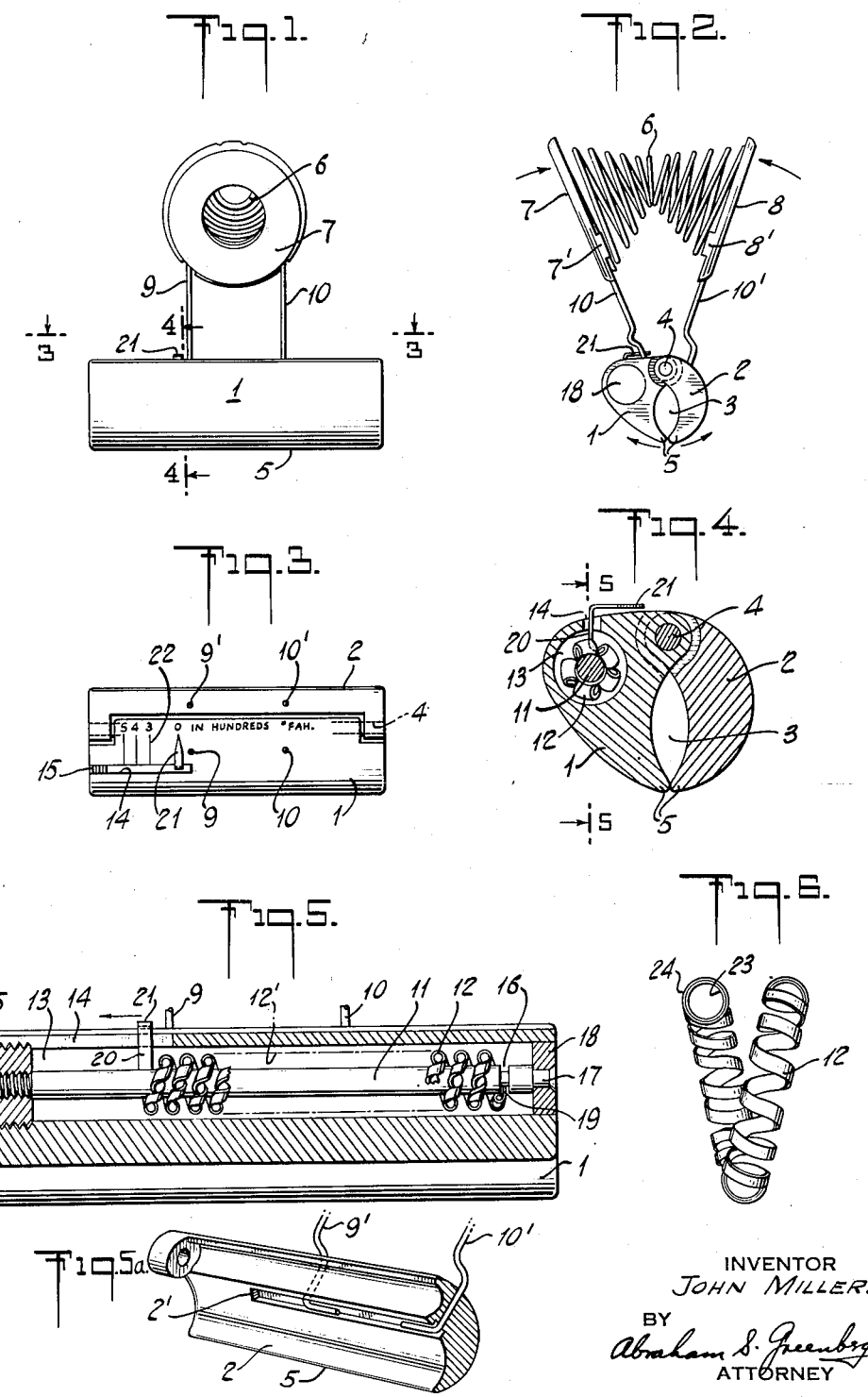

Sept. 2, 1952          J. MILLER          2,608,862
TEMPERATURE INDICATOR DEVICE
Filed May 1, 1947          2 SHEETS—SHEET 2
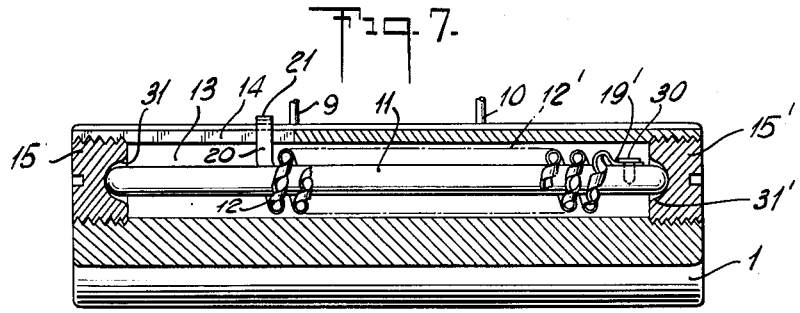
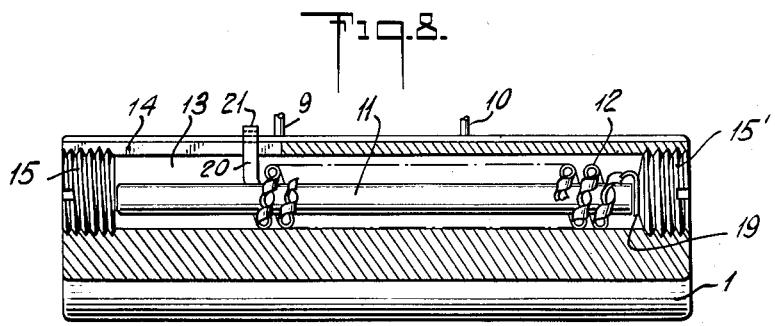
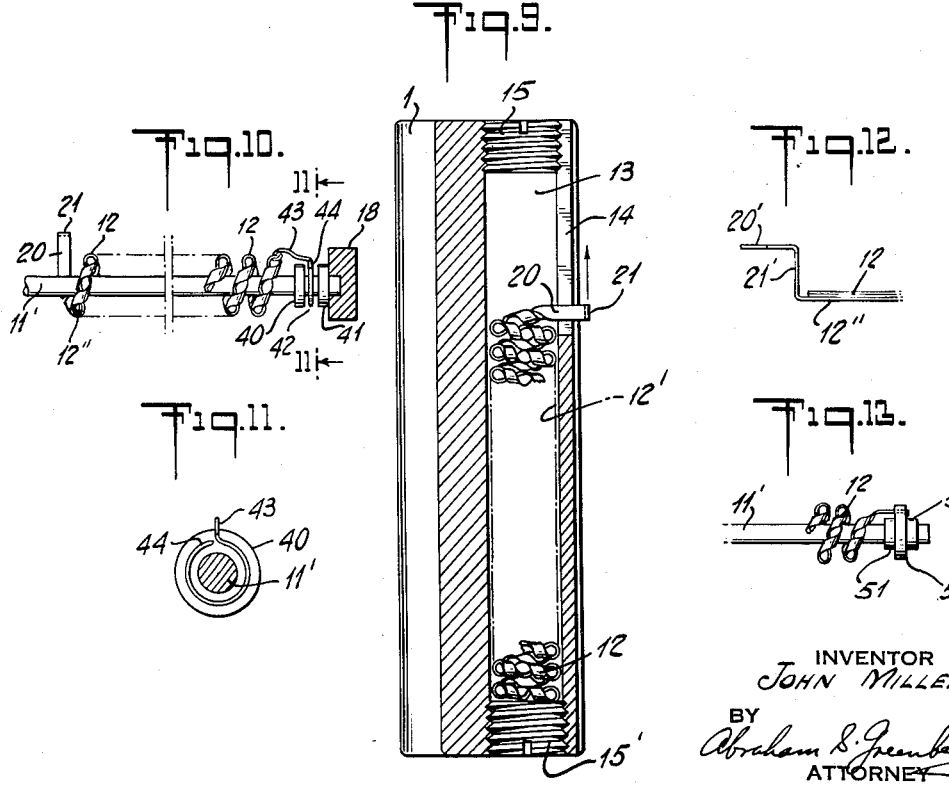
INVENTOR
JOHN MILLER.
BY
Abraham S. Greenberg
ATTORNEY Patented Sept. 2, 1952

2,608,862

UNITED STATES PATENT OFFICE 2,608,862

TEMPERATURE INDICATOR DEVICE

John Miller, Elmhurst, N. Y.

Application May 1, 1947, Serial No. 745,327

12 Claims. (Cl. 73—343)

My present invention relates generally to temperature indication devices, and more particularly to a simple and novel bimetallic coil arrangement for indicating temperature changes from ambient temperature.

There are many situations where it is highly desirable to indicate directly at a given object temperature changes thereof. For example, in heat treatment of metals, glass and china production, fire alarm systems, fire extinguishing systems, hair curling, engines, refrigerators, kitchen ranges and sterilization, to mention a few, it is desirable to have a simple, reliable, economical, and durable temperature indicator. Such an indicator should not utilize any glass in the construction thereof. In the case of an appliance whose temperature must be instantly known, it is very desirable to embody therein a temperature indicator capable of resisting the effect of extremely wide temperature changes and being highly durable at the same time.

It is, accordingly, an important object of my present invention to provide a temperature indicator device for an appliance; wherein the indicator is located within a bore provided in the interior of the appliance, and comprises a coil of the bimetallic element type having an end portion whose motion is restricted to a linear path.

In the field of hair curling it is important that the operator be aware at all times of the temperature of the curler clamps. Direct temperature indicator hair curler clamps have been proposed in the past. However, they have been impractical, and expensive to construct.

It is another important object of my invention to provide a hair curler clamp provided with a bore having a linear slot at a surface thereof, there being located within the bore a temperature-responsive coil having an end thereof exposed through the slot, and the coil being so constructed and arranged that it has both a linear motion at the exposed end and a concurrent free rotation at its opposite end.

It is a further object of my invention to utilize as a temperature-responsive device a bimetallic strip twisted to form a helicoidal member which is coiled in a generally helical form, one end of the double helix functioning as a temperature indicator and moving in solely a linear path while the remainder of the double helix is free for solely angular rotation.

It is an additional object of my invention to provide a pre-heat hair curling clamp, adapted for use in permanent waving, with a built-in temperature indicator which directly shows when the clamp is ready to use, and when ready to remove and/or reheat. The temperature indicator shows proper storage of heat for the different types of curls, and for the different types of hair actually encountered on the same head. Moreover, the clamp is, in accordance with my invention, provided with means for relatively comparing heat required. That is, if a curl shows too little or too much heat, the direct reading indicator provides a reference point for the next or proper heat. By providing a cylindrical bore in a jaw of the clamp for receiving the bimetallic double helix, the latter is completely surrounded by the heated member and thus is non-snarling as to hair.

Still further objects of my invention are to improve generally temperature indicators of the type carried directly by the body or appliance whose temperature is desired to be known, and more specifically to provide a direct temperature indicating hair curler clamp of simple and highly inexpensive construction which comprises a minimum of parts and is easy to assemble and use.

Still other features of my present invention will become clear as the description proceeds. It is to be understood that the following embodiments are illustrative of certain aspects of my invention.

In the drawings:

Fig. 1 shows a side elevation of an appliance, specifically a hair curling clamp, embodying the invention;

Fig. 2 is an end elevation of the clamp;

Fig. 3 is a plan view taken along line 3—3 of Fig. 1 looking in the direction of the arrows;

Fig. 4 is a section taken along line 4—4 of Fig. 1 looking in the direction of the arrows;

Fig. 5 is a side elevation in section taken along line 5—5 of Fig. 4 looking in the direction of the arrows;

Fig. 5a is a vertical sectional perspective of clamp jaw 2 adjacent element 10';

Fig. 6 is an enlarged detail view in side elevation of a single coil element;

Fig. 7 is a sectional view analogous to Fig. 5 showing a modification;

Figs. 8 and 9, each sectional views analogous to Fig. 5, show respectively different modifications of the coil arrangement of Fig. 5;

Fig. 10 shows a modified embodiment of the rod and bimetallic coil arrangement of Fig. 5, particularly adapted for high temperatures in excess of 300 degrees F.;

Fig. 11 is a sectional view taken on line 11—11 of Fig. 10, looking in the direction of the arrows;

Fig. 12 shows a modified construction at the indicator end of the coil; and

Fig. 13 shows a further modification of the anchor end of the coil in Fig. 10.

Referring now to the various figures, wherein similar numerals denote like structural elements, Figs. 1, 2 and 3 show the external appearance of a device or appliance whose temperature is indicated by my invention. Specifically the appliance is a hair curling clamp used in permanent hair waving. The clamp comprises a pair of elongated metal jaws 1 and 2 whose external configurations are generally convex and whose internal configurations are generally concave. While I prefer to employ aluminum for the jaws, any other metallic material may be employed. Aluminum is light, and is a metal ideally suited for hair curling devices. As shown, the interior concave faces of the jaws are arranged in opposed relation to provide the space 3 therebetween. Any suitable device may be used to provide an upper hinge for the jaws. Thus, the metallic pintle 4 may be passed through respective aligned bores provided at the upper edges of jaws 1 and 2, as shown in Figs. 3 and 4. The lower edges 5 of the jaws are in contact when the spring 6 is in its normal expanded condition shown in Fig. 2. The spring 6 is a coil whose turns progressively increase in size from the middle thereof towards each of discs 7 and 8.

I prefer to fabricate the coil spring 6, discs 7 and 8 from aluminum, or any other light metallic material. The opposite ends of coil 6 each terminate in a pair of spaced coupling or manipulating handle elements. It will be noted that the terminal turns of coil 6 are seated on the inner faces of discs 7 and 8. The latter may be provided with retaining flanges 7' and 8' rigidly to retain the coil 6 in the position shown in Fig. 2. The spaced parallel extensions or handles 9 and 10 of disc 7 are in respective alignment with the extensions 9' and 10' (see Fig. 3) of disc 8. The extensions 9, 9' and 10, 10' are of narrow cross-sectional diameter to reduce to a minimum the loss of heat from the bodies of jaws 1 and 2 to the discs and coil spring. I may secure the respective ends of coupling extensions 9, 9' and 10, 10' to the jaws in any suitable manner. For example, I have shown in Fig. 5a one illustrative method of securing the extension ends to the jaws. Thus, in the case of jaw 2 the ends of extension 9' and 10' are run through to the inner face of jaw 2, and the ends are bent into a horizontal groove 2'. The same construction is used for jaw 1.

The essential thing is rigidly to secure the lower ends of these extensions to the jaws so that when the spring 6 is compressed by finger pressure on the opposed discs 7 and 8, the four extensions will cause the jaws to open in the direction of the arrows shown in Fig. 2. I have thus provided a spring-biased hinged clamp whose coupling elements to the jaws enter the surfaces of the latter at restricted points, as shown in Fig. 3. The advantage of this construction resides in the fact that the operator can hold the metal discs 7, 8 comfortably even though the jaws are heated to a very high temperature. There is very little heat conducted along the extensions 9, 10.

Those skilled in the art of permanent hair waving are fully aware of the manner of using the clamp. The latter is generally heated to a high temperature of the order of 500 degrees Fahrenheit, and generally has some type of fabric packing placed between the curl of hair and the interior surfaces of jaws 1 and 2. As the heat of the metallic jaws is dissipated by radiation and absorption, the operator needs to know what the temperature changes are. In the past this has been done by removing the clamp and applying it to a temperature indicator, as for example a thermocouple thermometer. This is a laborious and wasteful process, when one considers all the clamps in use on the head. It has, also, been proposed to embody a glass type of thermometer in the clamp. However, such an expedient is impractical for many reasons.

In accordance with my present invention a simple and reliable metallic temperature indicator is embodied in one of the jaws, preferably the thicker jaw 1. The temperature indicator employs but two components viz., a metallic guide or center rod 11 and a bimetallic double helix coil 12. The center or guide rod 11 is located within a horizontal bore 13 provided with a uniform circular cross-section. The bore 13 runs through the thickest section of jaw 1, as indicated in Fig. 4, since that is the portion of the clamp best suited to house the indicator. It will be noted from Fig. 2 that the anchored ends of the coupling extensions 9 and 10 do not interfere with the horizontal bore 13.

The upper face of jaw 1 is, moreover, provided with a narrow slot 14 extending from the left end of the jaw (viewed as in Fig. 3) to a point somewhat to the right of coupling extension 9. The slot 14 is actually a restricted linear opening in the roof of bore 13. The specific dimensions of the bore 13 and slot 14 depend on the double helix coil 12 and its dimensions. Generally the cross-sectional diameter of bore 13 should be sufficiently greater than the diameter of one turn of the major helix of coil 12 (Fig. 6) to permit free motion of coil 12 in bore 13. Further, the slot 14 will be sufficiently wide to permit the left pointer end of the coil 12 freely to ride along the slot length.

The coil 12 is mounted on the rod 11, and the latter is fixedly secured at its opposite ends in any suitable manner. Thus, in Fig. 5 there is shown one way of anchoring rod 11 in bore 13 as the axis thereof. The left end of rod 11 is threaded, and screwed to a threaded closure 15. The latter is threadedly secured to an interior thread at the left open end of bore 13. Adjacent the right end of rod 11 there is provided a groove 16 spaced from the secured end 17. The end 17 is affixed, as by soldering or any other way, to a closure 18 for the respective open end of bore 13.

The coil 12 is wound around the rod 11, as clearly depicted in Fig. 5. Its right end 19 is bent into circular groove 16 so as to be able to ride in the groove in a circular path. That is to say, the groove 16 functions to locate the bent end 19 of coil 12, and to permit free angular motion therein in response to angular rotation of coil 12. The left end 20 of coil 12 projects vertically from rod 11 to slot 14, and projects through it, the exposed portion 21 thereof being bent at right angles to section 20. From Fig. 4 it is clear that exposed horizontal portion 21 functions in the manner of a pointer or index element. The vertical section 20 slides in a linear path in slot 14 between closure 15 and the right end of the slot 14. The pointer or index 21 projects a substantial distance to the rear of slot 14, and I provide graduations or indicia 22 to represent predetermined calibrated temperature readings. Thus, I have shown temperature markings from a desired minimum (say ambient temperature) up to temperatures of the order of 500 degrees Fahrenheit or higher. It is to be clearly understood that groove 16 and the rotatable anchor end 19 are constructed so as to maintain the right end of coil 12 anchored against linear displacement. The groove 16 will be made deep enough for that purpose. In Figs.

10 and 13 I have shown other arrangements for the same purpose.

In Fig. 5 the broken lines 12' schematically denote the fact that coil 12 is continuously wound over rod 11 between ends 19 and 20. It is to be clearly understood that while I have shown a bimetallic coil of the double helix type, the invention is not so restricted. I prefer to use the bimetallic double helix coil, because it provides a relatively large response to a given temperature change while occupying relatively small space. It is not believed necessary to discuss the construction of coil 12 at great length, since it is fully described by Fred A. Parsons in his U. S. Patent No. 2,121,259, granted June 21, 1938. The direction of response is determined in accordance with which one of the metallic strips is outermost in the original helix.

The single coil element of Fig. 6 shows that the minor helix of relatively small diameter is wound out of a narrow strip of any well known bimetallic metal, comprising two integrally joined strips or sheets 23, 24 of different metals, preferably resilient and having different coefficients of thermal expansion. The minor helix is then itself axially coiled helically to form a major helix wound in the form of a helical continuous hollow coil. The strip 23 in Fig. 6 has the lesser coefficient of thermal expansion thereby causing the major helix to expand along its axis when heated. If desired, the strips 23 and 24 may be reversed, and in that case the coil would contract along its axis when heated. Of course, in the latter case the minimum setting of pointer 21 would be adjacent closure 15.

It will be obvious from Fig. 5 that as the clamp jaws 1 and 2 are heated, the coil 12 will be heated up. As the coil expands axially, its end 20 will ride in slot 14 thereby causing pointer 21 to move to the left. The opposite end 19, which is the rotatable end of the coil, is permitted to rotate freely in a vertical plane to take up the helicoidal movement of the coil. This permits free and reliable longitudinal motion of pointer 21, and prevents sticking due to the angular motion of the major helix. The coil 12, of course, is freely slidable on the center rod 11. The coil 12, then, is seen to possess concurrent longitudinal and angular motions. It is emphasized that the temperature indicator may be located in a bore of any appliance whose temperature is to be observed, it being only necessary to provide the equivalent of slot 14 in the surface thereof.

In the specific embodiment disclosed herein, I have provided a pre-heat hair curling clamp (for permanent waving) with a temperature indication means built in. The indication means shows when the clamp is ready to use, and when it is ready to take off and/or reheat. The bimetallic double helix coil is advantageous for these reasons. It has the form to fit into the existing shape of clamp, and to give full view temperature indications along the length of the clamp. Further, the coil is non-snarling with respect to the hair due to its completely enclosed character. The coil fits into a well which completely surrounds the coil element with the heated member, and radiant and absorbent surfaces remain adjacent to each other in the same relative positions regardless of temperature. The coil gives a linear temperature response, and makes for ease of calibration.

The present temperature indicator shows the proper storage of heat for the different type of curls, and the different types of hair actually encountered on the same head. It provides a simple means of relatively comparing heat required, e. g., if a curl shows too little or too much heat, the indicator gives a reference point for the next or proper heat. The rod 11 through the center of the helix not only supports it, but it gives better heat conduction.

If desired the indicating end of the double helix coil can be kept inside with a washer perpendicular to the axis of the helix fastened on end. A slot in the clamp acts as a window through which to observe the motion of the end of the helix and to indicate temperature. There are other ways of providing rotating anchorage, as will be explained below. Further, the center rod 11 can be a tubing with a recessed shoulder simply pressed in thereby to provide lighter weight. As will be shown in connection with Fig. 9, the double helix coil can be merely put in loose in bore 13. In such case the clamp is always used vertically whereby the helix rests on its lower end to give a satisfactory temperature indication.

In Fig. 7 I have shown a modified embodiment, wherein the rod 11 is mounted for rotation at its ends. The rod 11 is thus provided at its opposite ends with bearings whereby it is free to rotate in response to angular rotation of coil 12 whose end 19' is now fixedly secured, as at 30, to the adjacent end of rod 11. The angular rotation of coil 12 is now translated, by virtue of the rigid coupling between coil end 19' and rod 11, into rotation of rod 11 on its bearings. The threaded end closures 15, 15' of bore 13 are provided with bearing cups 31, 31', and the respective rounded ends of rod 11 readily move in these cups. It will be understood that the device is otherwise the same as explained in connection with Figs. 1 to 5.

The modification in Fig. 8 differs from the arrangements of Figs. 5 and 7 in that the freely rotatable end 19 of double helix coil 12 is retained between the end of rod 11 and the inner face of threaded end plug or closure 15'. The end 19 must be sufficiently loose so as not to bind. The left end of rod 11 is not affixed to the left plug or closure 15. Hence, the rod 11 acts more as a centering rod than as a support device as in Fig. 5. The rod 11 rests on the coil 12. Here, the coil 12 will rest on the bottom of bore 12, but will freely rotate as the expansion occurs. Hence, the pointer 21 will freely move in slot 14.

As stated previously, the rod 11 may be dispensed with. However, in that case the clamp must be used in a vertical position. In Fig. 9 I have shown the jaw 1 in vertical position, with the lower end of coil 12 resting on the inner face of threaded end plug or closure 15'. The upper end 20 and pointer 21 are adapted for vertical linear motion, the end 20 reciprocating in slot 14. It is clear that as the coil 12 expands due to a temperature rise, the coil will be free for angular rotation thereby to prevent sticking. It will be understood that in this figure, as well as Figs. 7 and 8, I have shown only the interior construction of jaw 1 to preserve simplicity of description.

It will be understood that many other arrangements can be employed to permit the angular rotation of coil 12 as it contracts or expands. Further, there may be encountered warping of the coil, especially at the ends thereof. This warping may become sufficiently pronounced at higher temperatures, say above 300 degrees F., to result in the anchor end (for example 19 in Fig. 5) slipping from its groove. The coil may then become jammed and erratic. In Figs. 10 to 13 I have shown several illustrative ways of overcoming this defect when it occurs.

Figs. 10 and 11 show one embodiment for compensating against any tendency of the bimetallic coil 12 to warp. It is to be understood that this embodiment is a modification of Fig. 5. I have omitted the jaw 1, and show only the centering rod, coil and closure 18. The rod 11' is of approximately half the cross-sectional diameter of rod 11. This permits freedom of rotation of coil 12 on the rod thereby taking care of excessive warping. At the anchor end of coil 12 there is provided a pair of spaced washers 40, 41. These washers or discs are affixed to the rod in any suitable manner. The stub of rod 11' to the right of washer 41 is fixed in a suitable hole in closure 18. It will be noted that the effect of this construction is to provide a circular groove 42 between washers 40 and 41. The terminal minor helical turn of coil 12 is secured to the end of a horizontal wire 43. The wire or link 43 terminates in a loop 44 located in groove 42 around the rod 11'. It will now be seen that as coil 12 undergoes angular rotation, the anchor wire 43 with its loop at groove 42 will function to permit such rotation and yet restrain the possibility of the right end of coil 12 warping into a jamming position. In other words, I have provided a positive rotatable anchor for coil 12.

The pointer end of coil 12 may be replaced by a single strip of metal which is either bonded or wound to the end of the bimetallic coil 12. The right end of coil 12 could, of course, be bonded or wound to the adjacent end of wire 43. In Fig. 12 I have shown the edge view of a single strip of metal bent to provide exposed pointer 20' and interior section 21'. The end of coil 12 has the single strip 12" wound therewith for a few turns. In this way the pointer 20' will not be caused to change its vertical position due to warping at the bimetallic coil 12. As stated previously, 12" may be bonded to 12 instead of being wound therewith.

In Fig. 13 I show another modification to provide a positive rotatable anchor. Here the washer 50 is rotatably mounted on rod 11'. That is, the fixed washers 40 and 41 of Fig. 10 and the wire 43 are replaced by the single washer or disc 50 mounted between fixed stops 51 and 52. The end of coil 12 is passed through an aperture in washer 50 and secured so that upon angular motion of coil 12 the washer 50 rotates therewith.

It is to be clearly understood that other positive rotatable anchor devices are possible. In general, they provide a more precise and positive arrangement for anchoring the rotatable end of the expanding coil 12 and to overcome any tendency of the coil to jam due to warping.

In Fig. 9 I have shown a modification wherein the rod 11 is omitted, the clamp being used in vertical position. The clamp may be used horizontally with the centering rod 11 omitted by providing the inner end of closure 15' with a projection of decreased cross-sectional diameter, the adjacent end of coil 12 being provided with a hook (as 19 in Fig. 5) or a loop (as 44 in Fig. 10) which is located in a circular groove provided in the closure projection. In other words, the right end of coil 12 is rotatably anchored to a circular groove provided in the inner end of closure 15'. If it is desired to use closure 15' exactly as it appears in Fig. 9, and still use the clamp horizontally with rod 11 omitted, the closure plug 15' may be permanently magnetized. In such case the adjacent end of coil 12 will be anchored to it with sufficient freedom for rotation. In all these variations described there is a generic mode of functioning.

What I claim is:

1. A temperature-responsive device, a heat conductive body provided with a bore, a helical bimetallic coil located in said bore, said body being provided with a linear slot communicating with the bore, one end of said coil being positioned in said slot for linear motion therein, and means operatively associated with the opposite end of said coil holding it against linear movement while permitting freedom of rotation whereby the coil is free for angular rotation in response to axial displacements caused by temperature changes.

2. In a temperature-responsive device as defined in claim 1, said coil consisting of a bimetallic double helix wherein the turns of the major helix are wound as a minor helix.

3. In a device as defined in claim 2, a centering rod positioned axially in said bore and passing axially through the bimetallic coil.

4. In a device as defined in claim 3, said coil having said one end bent to act as an index, said rod being provided with a circular groove adjacent the opposite end of said coil, said opposite end being positioned to ride in said groove.

5. In a device as defined in claim 1, said body being the jaw of a spring-biased hair curler clamp, said slot being located at a radially visible surface of the jaw, said one coil end having a projection linearly slidable along said surface, and temperature indications along the path of said projection.

6. In combination, a casing provided with an elongated well, a helical metallic temperature-responsive element wound generally in the form of a coil, said element being positioned in said well so as to permit axial displacement of the coil, said casing being provided with a slot of substantial length, said slot being in communication with the well, said coil element having an end thereof positioned in said slot for motion therein, and means operatively associated with the opposite end of said coil holding it against linear movement while permitting freedom of rotation whereby the coil is free for angular rotation within said well.

7. In a device as defined in claim 6, said element consisting of a bimetallic strip wound in the form of a double helix, and a support rod located in said well axially passing through the major helix of said element.

8. In a hair curling clamp comprising hinged metal jaws, one jaw having an elongated horizontal bore, a bimetallic double helix coil located in the bore, a metal centering rod axially secured at the opposite ends of the bore, said coil being wound around the rod, said jaw being provided with a linear slot communicating with the bore, one end of the coil projecting into said slot, and the opposite end of the coil being positioned in a circular groove located adjacent the respective end of the rod.

9. In a hair treating clamp having hinged metallic jaws, a bore in one jaw, a bimetallic double helix coil mounted in vertical position in the bore and having its lower end resting on the closed bottom of the bore, said jaw being provided with a slot at the upper end thereof, and the adjacent end of the coil being positioned in said slot for linear motion therein.

10. In combination, a bimetallic double helix coil provided at one end with an indicator element, means operatively associated with the indicator element whereby it is arranged to move in solely a linear path, said coil having two concurrent motions, one motion being rotary in the transversal sense, the other motion being longitudinal expansion, and means constructed and arranged to anchor the opposite end of said coil while permitting said two concurrent motions to take place.

11. In combination, a bimetallic double helix coil provided at one end with an element arranged to move in solely a linear path, said coil having two concurrent motions, one motion being rotary in the transversal sense, the other motion being longitudinal expansion, and means constructed and arranged to anchor the opposite end of said coil while permitting said two concurrent motions to take place, a casing provided with a bore, said coil being housed in said bore, said casing being provided with a linear slot for said element, indicia provided along said slot, and a rotatable anchor means coupled to said opposite end of the coil.

12. In a device as defined in claim 6, a centering rod in said coil, a positive anchor means rotatably mounted on said centering rod adjacent the opposite end of the coil element, said anchor means being coupled to said opposite end.

JOHN MILLER.

REFERENCES CITED

The following references are of record in the file of this patent:

UNITED STATES PATENTS

| Number | Name | Date |
|---|---|---|
| 1,933,801 | Hart | Nov. 7, 1933 |
| 2,121,259 | Parsons | June 21, 1938 |
| 2,141,759 | Moffat | Dec. 27, 1938 |
| 2,265,733 | Jones | Dec. 9, 1941 |

FOREIGN PATENTS

| Number | Country | Date |
|---|---|---|
| 157,281 | Austria | Oct. 25, 1939 |
| 108,001 | Australia | July 14, 1939 |
| 324,507 | Great Britain | Jan. 30, 1930 |
| 833,088 | France | July 11, 1938 |